June 13, 1933.　　　C. SCHAEFFER　　　1,913,901
BRAKING DEVICE FOR MOTOR VEHICLES
Filed Feb. 4, 1931　　2 Sheets-Sheet 2
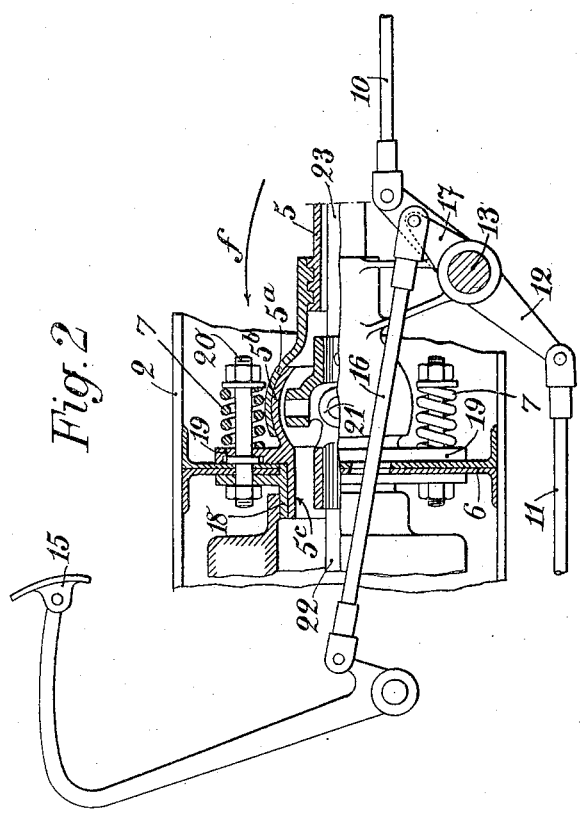
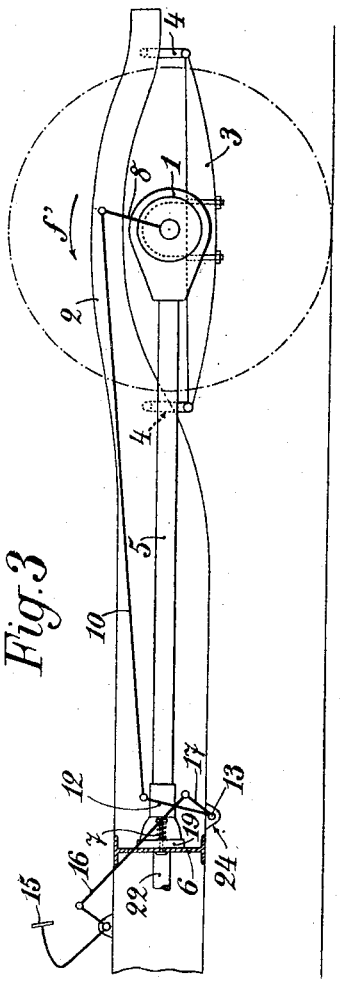
C. Schaeffer
INVENTOR Patented June 13, 1933

1,913,901

UNITED STATES PATENT OFFICE

CHARLES SCHAEFFER, OF PARIS, FRANCE, ASSIGNOR TO STE ANME DES ANCIENS ETABLISSEMENTS PANHARD & LEVASSOR, OF PARIS, FRANCE

BRAKING DEVICE FOR MOTOR VEHICLES

Application filed February 4, 1931. Serial No. 513,424, and in France February 14, 1930.

It is more and more necessary to increase the braking power on motor vehicles and above all on those intended for an industrial purpose, on account of their ever increasing weights and speeds.

As the driver can only exert a limited braking effort on the brake pedal, an external force is often used to increase the brake power and said force is obtained by means of either pneumatical or hydraulical or mechanical servo-motors, but these devices are all intricate and their fitting on vehicles results in important costs.

This invention has for its object to provide a very simple device which allows to considerably increase the braking power without using any auxiliary apparatus.

According to this invention, the rear axle casing is so connected to the chassis that it can move yieldingly back and forth relatively to the latter, and the brake control rigging is so arranged as to set up an automatic increase in the tightening of the brakes as the rear axle casing is moving backwards with respect to the chassis, which backward movement will take place automatically as soon as the brakes begin to be tightened sufficiently.

The braking power thus obtained is a function of the mass in motion and of the relative backward travel of the rear axle casing, which itself is a function of the initial braking action set up by the driver, and the power increase obtained is also dependent on the rigging arrangement, e. g. on the ratio between the lever arms used to transmit the effort set up by the brake pedal on one hand and the effort set up by the relative displacement of the rear axle casing with the chassis on the other hand.

An embodiment of a braking device according to this invention is shown in the drawings appended hereto by way of example.

Figure 2 is a fractional vertical cross section showing the elastic connection of the thrust tube with the chassis, some of the parts being shown in elevation.

Figure 3 is an explanative diagram of another form of construction.

Figure 1:
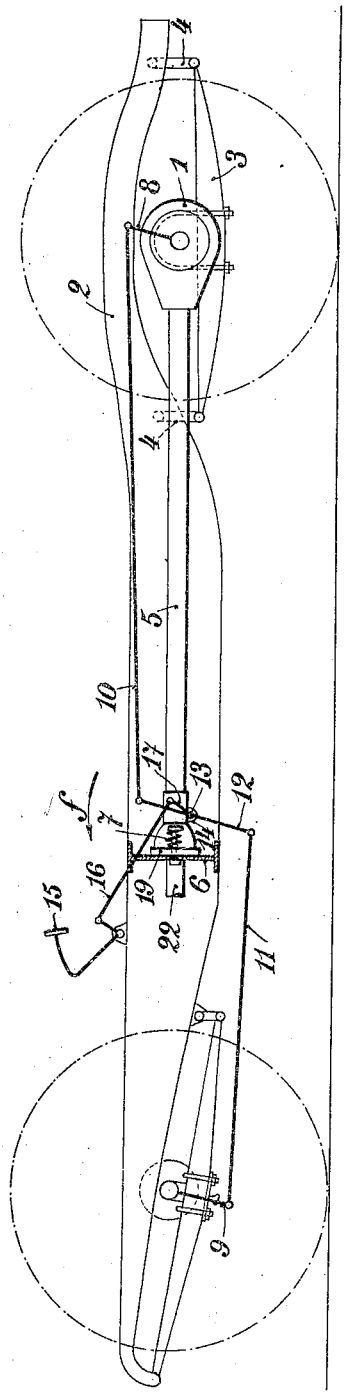
Figure 1 is an explanative diagram.

In Fig. 1, 1 designates the rear axle casing and 2 the chassis which is suspended on the same by a spring 3 and hangers 4 allowing the casing to move back and forth with respect to the chassis.

The thrust tube 5 bears against a cross member 6 of the chassis; however, it can move away therefrom while compressing the springs 7 when a backward movement of the rear axle casing with respect to the chassis is produced by braking.

The chassis as shown is fitted with brakes both at the rear and front thereof; 8 and 9 designate the brake tightening levers for these brakes, which are connected by rods 10, 11 to levers 12 secured on a shaft 13. The latter is mounted in bearings 14 carried by the thrust tube 5 and operated by the brake pedal 15 to which it is secured through a rod 16 and a lever 17.

As the driver depresses the pedal 15 he will in the usual manner produce a definite tightening of the front and rear brakes through the rigging 16, 17, 13, 12, 10, 8 and 11, 9. Such braking action will immediately produce a backward movement of the rear axle casing, the tube 5 and the shaft 13 with respect to the chassis; as rod 16 is maintained by the pressure of the foot on the pedal it will not partake to such backward movement, so that the latter will cause the levers 17 and 12 to swing further in the direction for an increase in the braking effect (arrow f).

On release, the springs 7 will bring again the thrust tube 5 into engagement with the part 6 of the chassis and the pedal 15 will be restored into its inoperative position.

Figure 2 shows how the thrust tube 5 is connected to the chassis; secured to its front end is a spherical socket 5a which is slidingly fitted about a ball 5b rigid with a sleeve 5c adapted to slide in a bush 18 secured to the chassis and which carries a flange 19 adapted to bear against the back face of the member 6. The springs 7 are coiled about bolts 20 which project through the said flange and member 6 of the chassis.

The ball 5b houses the gimbal 21 by which the main shaft 22 is connected in the usual manner with the driving shaft 23 received in tube 5.

Figure 3 shows that it is not necessary that the shaft 13 should be mounted in brackets partaking of the backward movement of the rear axle casing. In this example which comprises rear brakes only, the shaft 13 is mounted in brackets 24 secured to the chassis. In this case, as the pedal 15 is being depressed by the driver, the braking action will again take place in the usual manner, whereafter the backward movement of the rear axle casing with respect to the chassis and the rigging 16, 17, 20, 10 carried thereby will set up an additional deflection of the lever 8 in the direction for braking (arrow $f'$), which results in a considerable increase of the braking power.

It is to be understood that the invention is not limited to the embodiments shown and that numerous rigging arrangements allowing the backward movement of the rear axle casing with respect to the chassis with a view to increase the tightening of the brakes can be devised easily.

I claim:

1. In a braking device for motor vehicles comprising a chassis, a rear axle casing, brakes acting upon the wheels, a brake actuating pedal lever and a brake rigging connecting the said lever to the brakes, the combination of connecting means between the said rear axle casing and the said chassis, so arranged as to allow the said rear axle casing to move backwards and forwards relatively to the chassis, the said brake rigging being adapted to set up an automatic increase of the tightening of the brakes when the said rear axle casing moves backwards relatively to the said chassis, the said rigging comprising a transverse shaft, levers mounted on the said shaft, rods connected to the said levers and adapted to actuate the brakes, brackets carrying the said transverse shaft, the said brackets being so arranged as to partake of the forward and backward motion of the said rear axle casing.

2. In a braking device for motor vehicles comprising a chassis, a rear axle casing, brakes acting upon the wheels, a brake operating pedal lever and a brake rigging connecting the said lever to the brakes, the combination of connecting means between the said rear axle casing and the said chassis, so arranged as to allow the said rear axle casing to move backwards relatively to the said chassis, the said means comprising a thrust tube for transmitting the thrust of the said rear axle casing to the said chassis, a spherical socket connected to the front end of the said thrust tube, a ball on which is slidably adjusted the said spherical socket, a bush connected to the said ball, a flange connected to the said bush, a sleeve connected to a portion of the chassis in which slides the said bush, springs constantly urging the said flange into engagement with the said portion of the chassis, and the said brake rigging being adapted to set up an automatic increase of the tightening of the brakes when the rear axle casing moves backwards relatively to the said chassis.

In testimony whereof I have hereunto affixed my signature.

CHARLES SCHAEFFER.